United States Patent
Clark et al.

(10) Patent No.: US 10,587,331 B1
(45) Date of Patent: *Mar. 10, 2020

(54) RF REPEATER AND MOBILE UNIT WITH CANCELLATION OF INTERFERENCE FROM A REPEATED SIGNAL

(71) Applicant: Resonant Sciences, LLC, Dayton, OH (US)

(72) Inventors: Randall T Clark, Beavercreek, OH (US); Nathan Thomas Kornbau, Beavercreek, OH (US); Jeremy Micah North, Dayton, OH (US)

(73) Assignee: Resonant Sciences, LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,616

(22) Filed: Jul. 9, 2019

Related U.S. Application Data

(63) Continuation of application No. 15/985,223, filed on May 21, 2018, now Pat. No. 10,355,771.

(60) Provisional application No. 62/509,234, filed on May 22, 2017.

(51) Int. Cl.
*H04B 7/155* (2006.01)
*H04B 1/10* (2006.01)
*H04W 16/26* (2009.01)

(52) U.S. Cl.
CPC ....... *H04B 7/15514* (2013.01); *H04B 1/1018* (2013.01); *H04B 7/15535* (2013.01); *H04B 7/15571* (2013.01); *H04W 16/26* (2013.01); *H04B 7/1555* (2013.01)

(58) Field of Classification Search
CPC ........... H04B 7/15507; H04B 7/15585; H04B 7/086; H04B 7/15514
See application file for complete search history.

(56) References Cited

U.S. PATENT DOCUMENTS

| | | | |
|---|---|---|---|
| 4,475,246 A | 10/1984 | Batlivala et al. |
| 4,878,251 A | 10/1989 | Richardson |
| 4,989,262 A | 1/1991 | Saito |
| 7,555,219 B2 | 6/2009 | Cox et al. |
| 8,135,339 B2 | 3/2012 | Ranson et al. |
| 8,285,201 B2 | 10/2012 | Gore et al. |
| 8,503,926 B2 | 8/2013 | Gainey et al. |

(Continued)

FOREIGN PATENT DOCUMENTS

JP        2002171215 A        6/2002

OTHER PUBLICATIONS

Carusone et al.; "Analogue Adaptive Filters: Past and Present"; IEE Proc.-Circuits Devices Syst.; vol. 147, No. 1; Feb. 2000.

*Primary Examiner* — Keith Ferguson
(74) *Attorney, Agent, or Firm* — Christopher M. Ramsey; GrayRobinson, P.A.

(57) ABSTRACT

A radio frequency repeater device includes a receive antenna that receives a receive signal having a first frequency. A transmit antenna transmits a repeat signal at the first frequency, the repeat signal being an amplified version of the receive signal. A signal filter communicates with the receive antenna and transmit antenna, the signal filter being operable to amplify quadrature and non-quadrature components of an input signal associated with the repeat signal to produce a filtered repeat signal. A coupler combines the receive signal with the filtered repeat signal in such a way that the filtered repeat signal cancels interference from the transmitted repeat signal in the receive signal.

19 Claims, 8 Drawing Sheets

(56) References Cited

U.S. PATENT DOCUMENTS

| | | |
|---|---|---|
| 8,571,470 B2 | 10/2013 | Ranson et al. |
| 8,630,211 B2 | 1/2014 | Gainey et al. |
| 8,725,067 B2 | 5/2014 | Ahn et al. |
| 8,755,750 B2 | 6/2014 | Cox et al. |
| 8,868,006 B2 | 10/2014 | Cox et al. |
| 9,209,840 B2 | 12/2015 | Cox |
| 9,628,318 B1 | 4/2017 | Gerdes et al. |
| 9,692,469 B1 | 6/2017 | Clark et al. |
| 9,781,612 B2 | 10/2017 | Buskgaard et al. |
| 2004/0032904 A1 | 2/2004 | Orlik et al. |
| 2004/0151238 A1 | 8/2004 | Masenten |
| 2010/0279602 A1 | 11/2010 | Larsson et al. |
| 2011/0170473 A1 | 7/2011 | Proctor et al. |
| 2011/0310869 A1 | 12/2011 | Xhafa et al. |
| 2013/0163482 A1 | 6/2013 | Suzuki et al. |
| 2014/0194054 A1 | 7/2014 | Kim |
| 2015/0065033 A1 | 3/2015 | Kruglick |
| 2017/0156039 A1 | 6/2017 | Zhao et al. |
| 2017/0195036 A1 | 7/2017 | Kwon et al. |

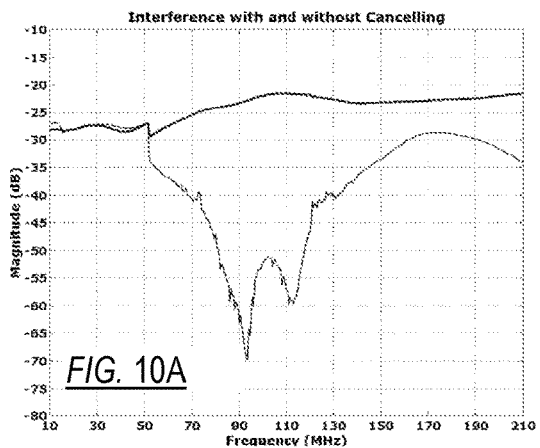
30 dB Cancellation from 80 to 120 MHz
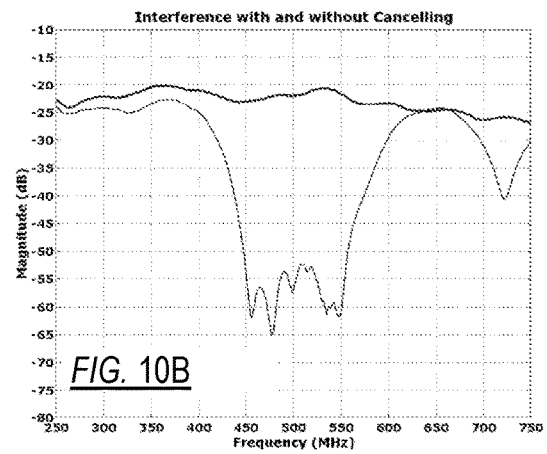
30 dB Cancellation from 450 to 550 MHz
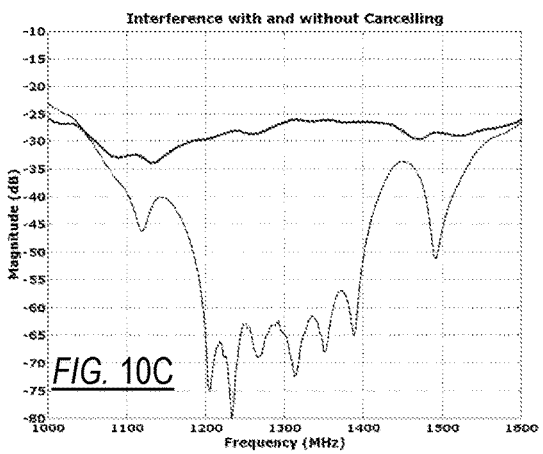
30 dB Cancellation from 1200 to 1400 MHz
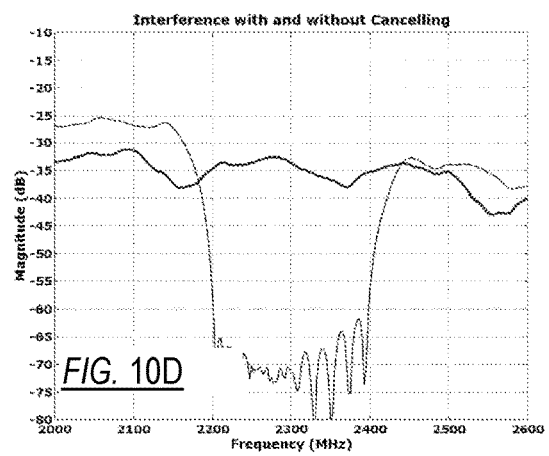
30 dB Cancellation from 2200 to 2400 MHz
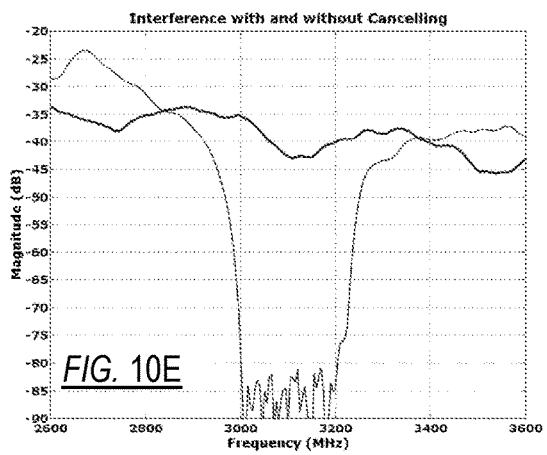
45 dB Cancellation from 3000 to 3200 MHz
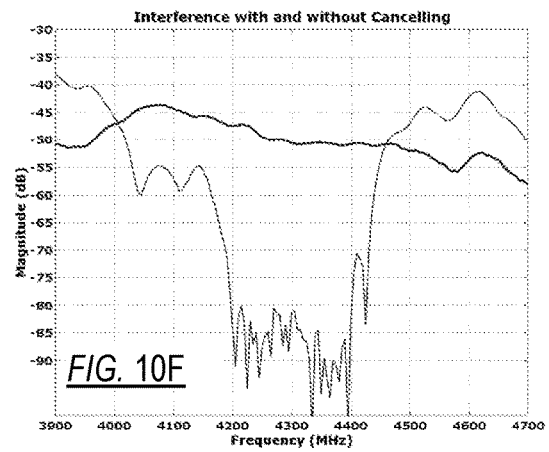
35 dB Cancellation from 4200 to 4400 MHz

RF REPEATER AND MOBILE UNIT WITH CANCELLATION OF INTERFERENCE FROM A REPEATED SIGNAL

CROSS-REFERENCE TO RELATED APPLICATION

This is a continuation of application Ser. No. 15/985,223, filed May 21, 2018, which claims the benefit of priority from provisional Application No. 62/509,234, filed May 22, 2017, which are incorporated by reference in their entirety.

BACKGROUND

Field

This relates to the field of RF signal repetition in a communications network and, more particularly, to reducing signal interference between a received signal and a repeated signal.

Background

Wireless communications are almost ubiquitous in modern culture. People and devices are continuously transmitting and receiving information over wireless networks. Wireless networks are now located around the world, but there are still geographic areas, even in technologically developed regions, where wireless communication is difficult because there is no base station in the vicinity.

One technique for extending the coverage of a wireless network of base stations is to position repeaters in geographic locations where the network coverage is weak. A repeater is a device that receives a signal, amplifies the signal, and transmits the amplified signal. Repeaters are typically stand-alone units designed to cover a specific geographic area. Small repeaters can even be placed inside houses or offices to enhance signal strength.

Some repeaters are capable of sending and receiving signals over the same carrier frequency. A major problem with these so-called "same frequency repeaters," is interference between signals being transmitted and signals being received over the same frequency. This interference makes both transmitted and received signals noisy.

BRIEF SUMMARY

In view of the foregoing, it would be useful to have an apparatus that could cancel interference between transmitted and received signals travelling on overlapping carrier frequency bands in a communications network. The repeater described here provides improved performance by cancelling interference over wide frequency range and at a broad instantaneous bandwidth.

A radio frequency repeater device has a receive antenna that receives a receive signal having a first frequency and a transmit antenna that transmits a repeat signal at the first frequency, the repeat signal being an amplified version of the receive signal. A signal filter communicates with the receive antenna and transmit antenna. The signal filter is operable to amplify quadrature and non-quadrature components of an input signal associated with the repeat signal to produce a filtered repeat signal. A coupler combines the receive signal with the filtered repeat signal in such a way that the filtered repeat signal cancels interference from the transmitted repeat signal in the receive signal.

In such a repeater device, the transmit antenna and receive antenna may be the same antenna.

In such a repeater device, the quadrature components of the input signal may be 90 degrees out of phase with each other and the non-quadrature components of the input signal may not be 90 degrees out of phase with each other.

In such a repeater device, the signal filter may include a signal weight adjuster adapted to impart separate signal weights to the quadrature and non-quadrature components of the input signal.

In such a repeater device, the transmitter and receiver may transmit and receive at overlapping frequencies simultaneously.

The device of claim may be a component of a cellular telephone, for example.

A cellular communications method includes, in a cellular communications network, receiving by a first mobile unit a wirelessly transmitted signal from a second mobile unit or a base station. A repeat signal is formed by the first mobile unit, the repeat signal being an amplified version of the wirelessly transmitted signal. The repeat signal is transmitted from the first mobile unit. Interference caused by transmitting the repeat signal is cancelled using a signal filter on the first mobile unit that amplifies quadrature and non-quadrature components of an input signal associated with the repeat signal to produce a filtered repeat signal.

In such a method, the wirelessly transmitted signal and repeat signal that is transmitted may have overlapping frequencies.

In such a method, the wirelessly transmitted signal may be being received at the same time the repeat is being transmitted.

In such a method, the first mobile unit may be a cellular telephone.

In such a method, the quadrature components of the input signal may be 90 degrees out of phase with each other and the non-quadrature components of the input signal may not be 90 degrees out of phase with each other.

In such a method, the signal filter may include a signal weight adjuster adapted to impart separate signal weights to the quadrature and non-quadrature components of the input signal.

In such a method, the first mobile unit is configured to transmit and receive signals at the same frequency simultaneously.

An electronic device includes a mobile unit having an antenna that transmits and receives radio signals within a cellular network. The mobile unit includes a repeater in communication with a receive signal path and transmit signal path, the repeater being operable to pass a repeated signal associated with the receive signal to the transmit signal path. The mobile unit also includes a signal filter communicating with the receive signal path and transmit signal path. The signal filter is operable to amplify quadrature and non-quadrature components of an input signal associated with the repeat signal to produce a filtered repeat signal and to cancel interference caused by the repeated signal in the receive signal path with the filtered repeat signal.

In such an electronic device, the mobile unit may transmit and receive radio signals at overlapping frequencies.

In such an electronic device, the mobile unit may transmit and receive radio signals at overlapping frequencies simultaneously.

In such an electronic device, the quadrature components of the input signal are 90 degrees may be out of phase with each other and the non-quadrature components of the input signal may not be 90 degrees out of phase with each other.

In such an electronic device, the signal filter may include a signal weight adjuster adapted to impart separate signal weights to the quadrature and non-quadrature components of the input signal.

In such an electronic device, the mobile unit may be a cellular telephone.

BRIEF DESCRIPTION OF THE DRAWINGS

FIG. 10A is a graph of experimental measurements of signal cancellation between 10 MHz and 210 MHz.

FIG. 10B is a graph of experimental measurements of signal cancellation between 250 MHz and 750 MHz.

FIG. 10C is a graph of experimental measurements of signal cancellation between 1000 MHz and 1600 MHz.

FIG. 10D is a graph of experimental measurements of signal cancellation between 2000 MHz and 2600 MHz.

FIG. 10E is a graph of experimental measurements of signal cancellation between 2600 MHz and 3600 MHz.

FIG. 10F is a graph of experimental measurements of signal cancellation between 3900 MHz and 4700 MHz.

DETAILED DESCRIPTION OF EXAMPLE EMBODIMENTS

This disclosure describes exemplary embodiments, but not all possible embodiments of the devices and methods. Where a particular feature is disclosed in the context of a particular example, that feature can also be used, to the extent possible, in combination with and/or in the context of other examples. The devices and methods may be embodied in many different forms and should not be construed as limited to only the examples described here.

Figure 1:
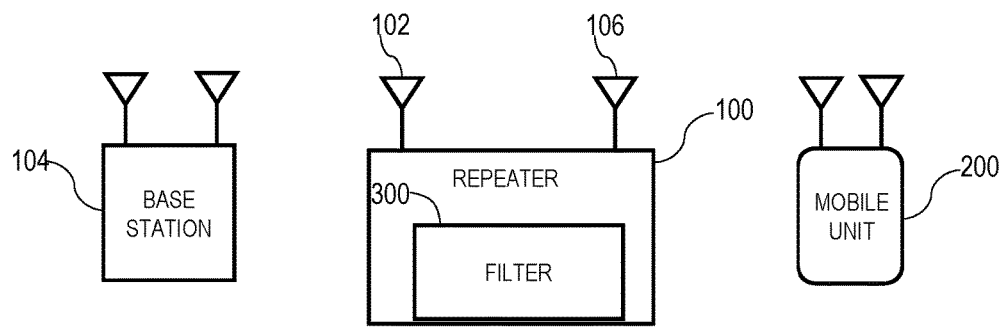
FIG. 1 is a block diagram of a cellular communication system including a repeater equipped with the signal filter.

Referring to FIG. 1, a repeater 100 in a cellular network may include a donor antenna 102 that communicates with a base station 104 and a server antenna 106 that communicates with a mobile unit 200. The repeater 100 amplifies signals sent from the base station 104 and transmits them to the mobile unit 200. The repeater 100 also amplifies signals sent from the mobile unit 200 and transmits them to the base station 104. A signal filter 300 cancels interference between the donor antenna 102 and server antenna 106.

The base station 104 is a fixed-location point of communication for cellular devices on a cellular carrier network. The base station 104 receives and transmits signals in the cellular network to cellular devices such as mobile units 200.

Mobile units 200 may be mobile communication devices such as cellular phones, tablets, computers, radios, and the like. The mobile unit 200 may include the typical hardware and software components one would find in modern mobile communication devices, such as a processor, memory, a keypad, a screen, and I/O ports, among others. In any example, the mobile unit 200 is a device capable of receiving and transmitting radio frequency wirelessly.

In some example implementations, the repeater 100 may be incorporated into a mobile unit 200, making the mobile unit 200 function as a repeater 100. This allows each mobile unit 200 in a network to serve as a repeater 100, which expands the coverage of the network as illustrated in FIG. 2.

Figure 2:
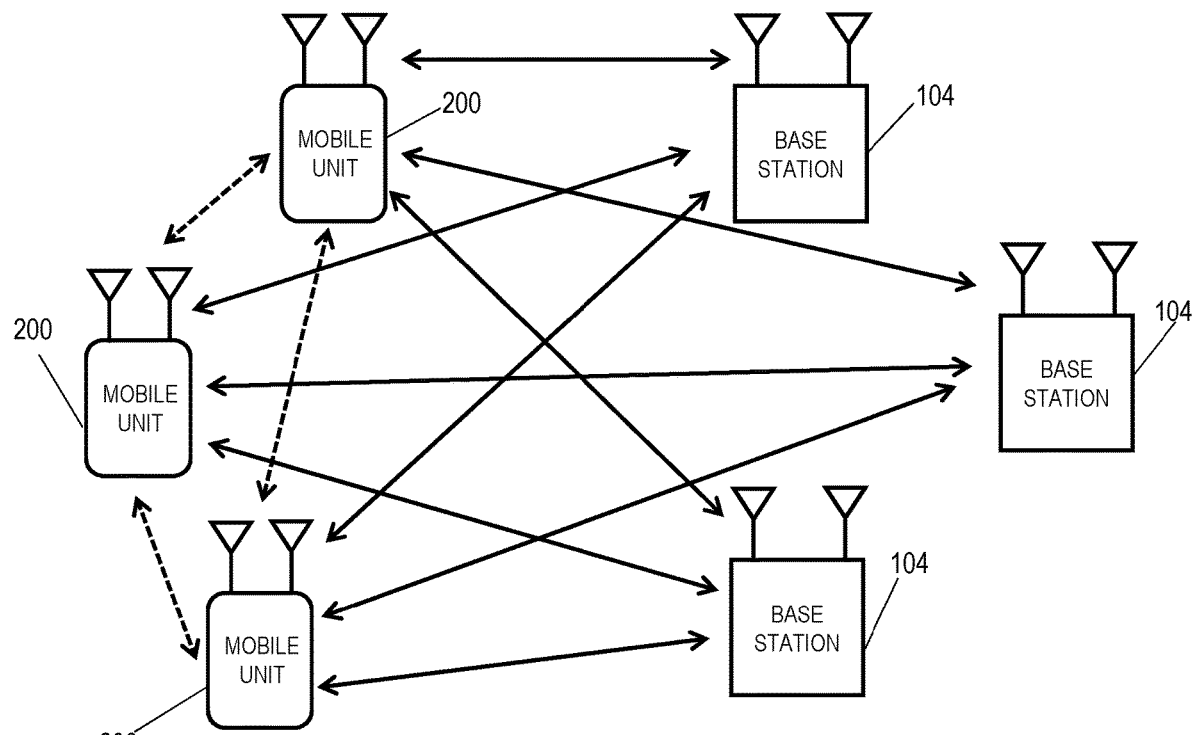
FIG. 2 is a block diagram of a cellular network including a plurality of base stations and a plurality of mobile units where the mobile units may function as repeaters.

In the cellular network illustrated in FIG. 2, the base stations 104 in the network can communicate with the mobile units 200 and the mobile units 200 can communicate with other mobile units 200 and base stations 104. The repeater function of the mobile units 200 allows each mobile unit 200 to receive a signal from another mobile unit 200 or a base station 104 and repeat that signal, sending it to another base station 104 or another mobile unit 200. This functionality is especially useful in remote geographic locations where base stations 104 are sparse. The repeater 100 allows each mobile unit 200 to expand the network's coverage.

Figure 3:
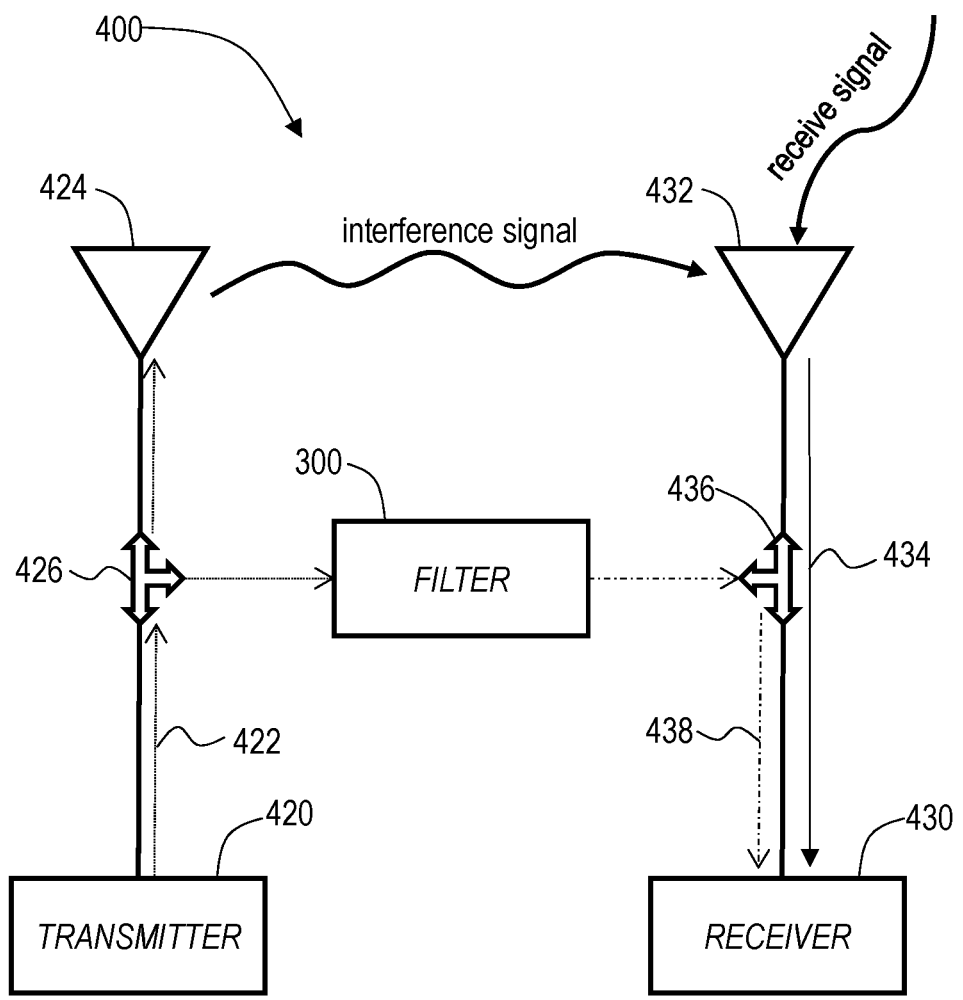
FIG. 3 is block diagram of an example of a signal filter system operating to cancel interference between two antennae.

Referring to FIG. 3, an example of an interference cancellation system 400 useful with the repeater 100 is generally shown. The system 400 includes a transmitter 420 that generates a transmit signal along a transmit path that is transmitted by a transmit antenna 424. The system 400 also includes a receiver 430 that is designed to receive a receive signal 434 at a receive antenna 432. Interference occurs when the receiver antenna 432 also receives the transmit signal, which is shown in FIG. 3 as the interference signal. Because the receiver antenna 432 receives both the receive signal 434 and the interference signal, the total signal that reaches the receiver 430 is the combination of both.

A first directional coupler 426 splits the transmit signal 422 into two portions: one that passes to the transmit antenna 424 and another that passes through the signal filter 300. A filtered transmit signal 438 exits the signal filter 300 and is combined with the receive signal 434 at a second direction coupler 436. The filtered transmit signal 438 is used to cancel the interference signal from the receive signal 434.

Figure 4:
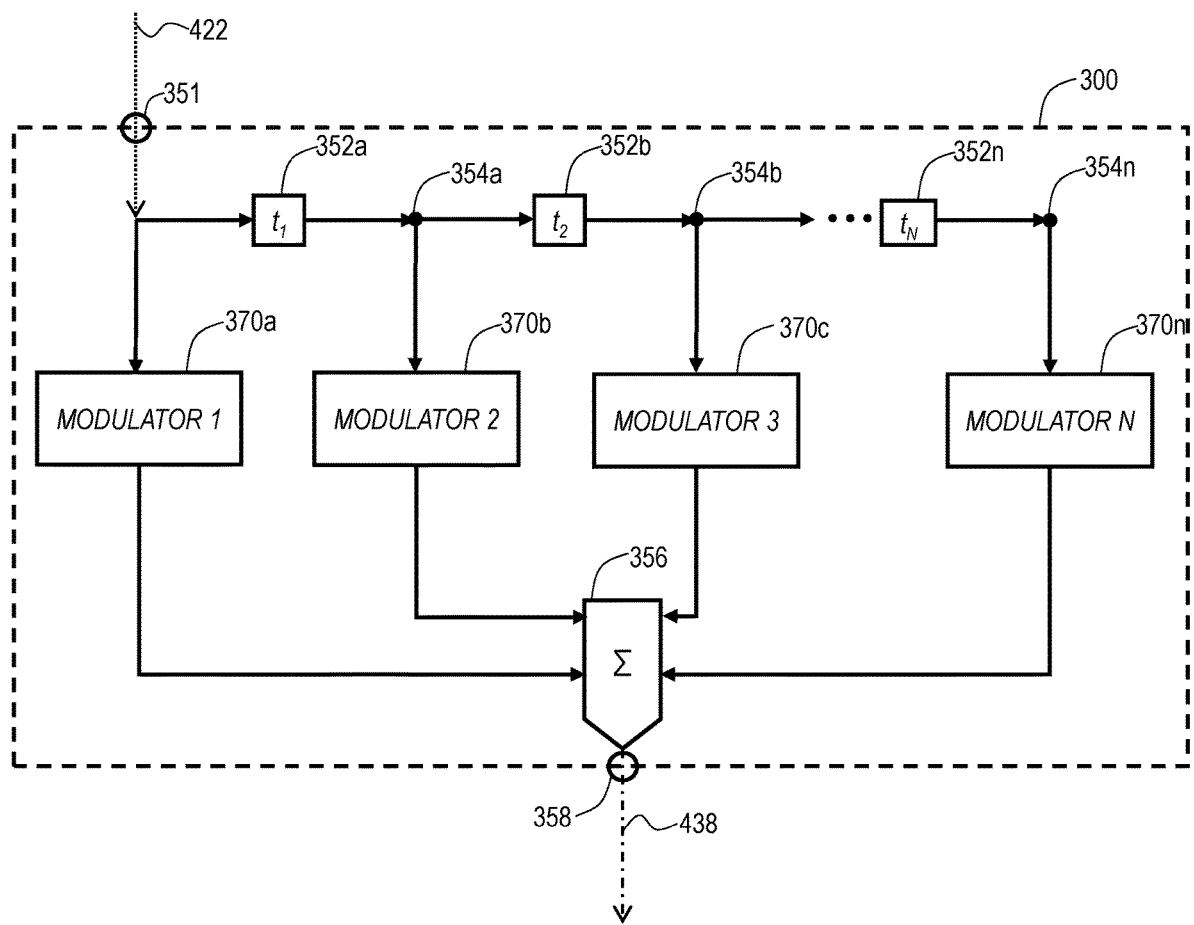
FIG. 4 is a block diagram of an example of the signal filter.

Details of the signal filter 300 are now described by referring to FIG. 4. The filter 300 functions like an analog tapped delay line filter. The filter 300 includes a transmit signal input port 351 that receives the transmit signal 422. The transmit signal 422 is passed through a plurality of tapped delay lines having a plurality of sequentially positioned taps 354 separated by delay times 352. The taps 354 feed a portion of the transmit signal 422 to a plurality of modulators 370. In the example shown, the letters (a,b,c . . . n) after the reference numerals 352, 354, and 370 illustrate that the filter may have any number of delay times 352, taps 354, and modulators 370. The number of taps 354 corresponds to the number of sampling points used to cancel the interference signal. The signals exiting the modulators 370 are combined in a signal adder 356, which outputs the filtered transmit signal 338 from an output port 358.

Figure 5:
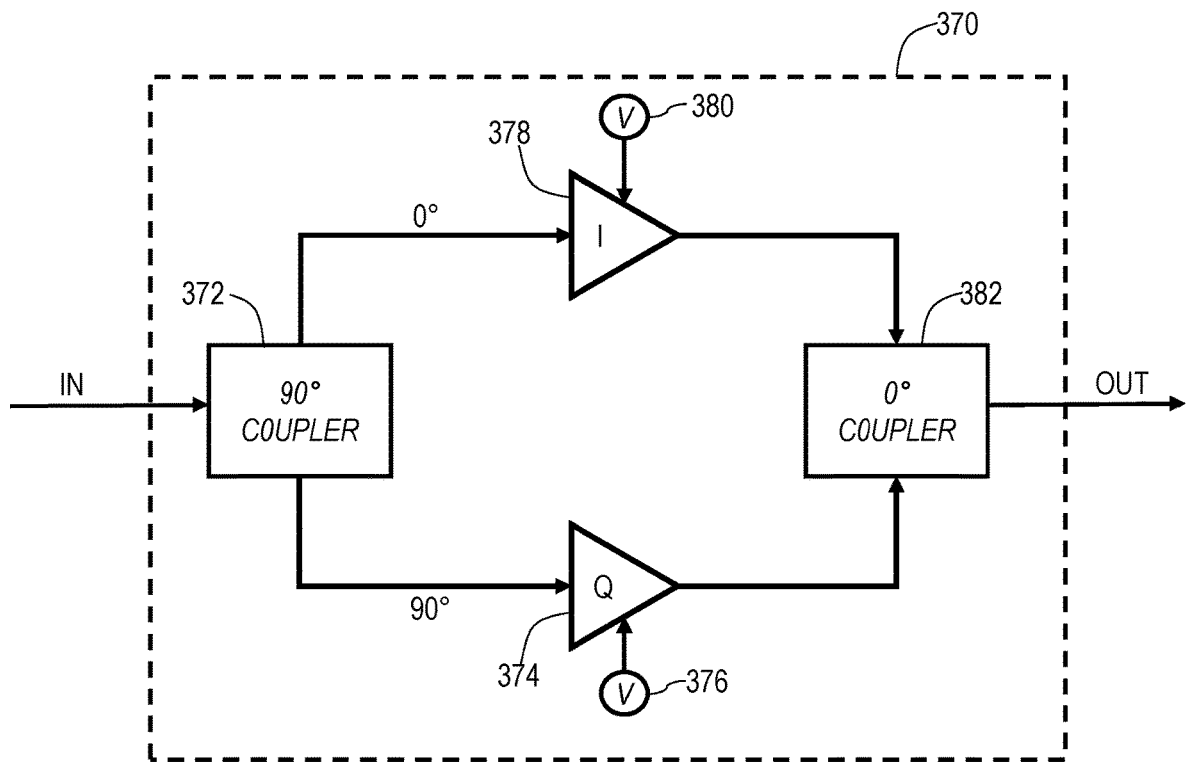
FIG. 5 is a block diagram of an exemplary modulator used in the signal filter.

Details of an exemplary modulator 370 are now described by referring to FIG. 5. The modulator 370 is an IQ modulator. When the modulator operates in its quadrature operational mode, an input signal is fed through a 90 degree coupler that splits the input signal into quadrature components: an in-phase component (I) and a quadrature component (Q) that are 90 degrees out of phase with each other. The respective weights of the I and Q components are adjusted, respectively, by an I-component amplifier 378 and a Q-component amplifier 374. Both of these amplifiers 374,378 are connected to a signal weight adjuster 376,380 such as a dual-polarity voltage controller. The signal weight adjuster 376, 380 allows for adjustment of the weights or amplitudes of the I and Q components of the signal. The I and Q components of the signal exit the amplifiers 374,378 and are combined at a signal combiner such as a two way 0 degree coupler 382.

The filter 300 has an operational range over which it cancel an interference signal from 10 MHz or below to 6 GHz or above and it had an instantaneous bandwidth that ranges from 5 MHz or below to several hundred MHz. The signal filter 300 may achieve 30 dB or greater cancellation of the interference signal. This broad operational frequency range is possible because the modulator 370 weights signals outside of the normal quadrature operational frequency range of the 90 degree coupler.

90 degree couplers are only designed to separate quadrature signals into I and Q components over an octave bandwidth, such as 1-2 GHz for example. When the input RF signal is within the quadrature operational frequency range of the 90 degree coupler, the 90 degree coupler will divide the signal into true I and Q vector components that are 90 degrees out of phase, where the I-component is the real vector component and the Q component is the imaginary vector component. In this scenario, the modulator 370 functions as a true vector modulator. The I and Q component amplifiers 374,378 may be adjusted to apply a desired weight to each component by supplying different voltages with the signal weight adjuster 376,380.

Conventional wisdom would suggest that the operational bandwidth of modulator employing a narrow band 90 degree coupler would be no more than the operational bandwidth of the 90 degree coupler. In other words, if the 90 degree coupler can only separate a modulated signal into true 90 degrees out of phase IQ components between 1-2 GHz, one would not expect the modulator to work very well outside the 1-2 GHz range.

A particularly advantageous feature of the modulator 370 is that its operational bandwidth is much larger than the 90 degree coupler's 372 operational bandwidth. This is because the modulator 370 can also operate outside the frequency range in which the 90 degree coupler can separate quadrature signals into IQ components.

Outside the quadrature operational frequency range, it does not separate the input signal into true real and imaginary vector components; instead, it simply splits the input signal into two non-quadrature components that are not 90 degrees out of phase with each other.

Adjusting the weights of the two non-quadrature component signals via the I and Q component amplifiers 374,378 may still allow for interference signal cancellation both above and below the quadrature operational frequency range of the 90 degree coupler. By taking advantage of this functionality, the operational frequency range of the modulator 370 is expanded beyond what would be expected when using a conventional narrow-band 90 degree coupler.

Figure 6:
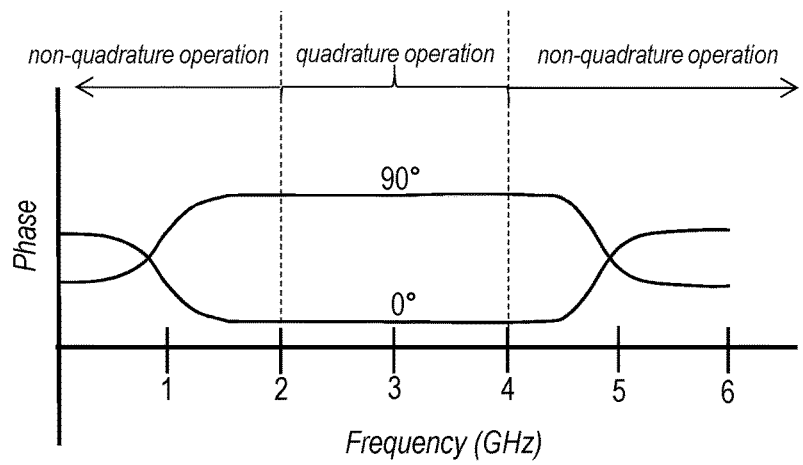
FIG. 6 is a graph illustrating the modulator I and Q channel phase vs frequency for a modulator that has a quadrature operational mode from 2-4 GHz.

FIG. 6 is an illustrative I and Q channel phase vs. frequency plot for a hypothetical modulator having a quadrature operational frequency range of 2-4 GHz. Between 2-4 GHz, the I and Q channels receive the 0 degree and 90 degree components of the modulated input signal. Above and below this range, however, the modulator operates in its non-quadrature operational mode because the modulated signals that reach the I and Q channels are not 90 degrees out of phase.

Figure 7:
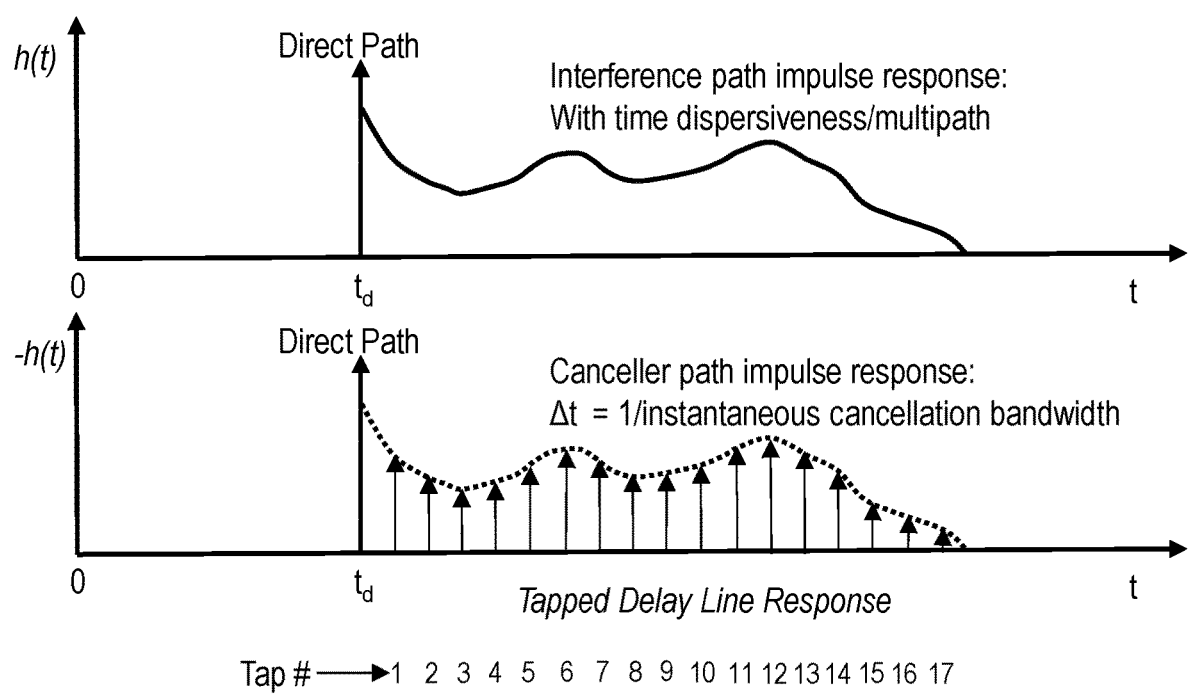
FIG. 7 is a set of graphs illustrating a method of cancelling signal interference. The upper panel is a graph of an interference path impulse response. The lower panel is a canceller path impulse response where a series of Nyquist samples are separated by a delay time to fit the interference path impulse response.

As illustrated in FIG. 7, the interference signal may be characterized by an impulse response that varies over time. The filter 300 generates a simulated time-dependent cancellation impulse response by fitting the true impulse response with a series of Nyquist samples that are separated by the delay time 352 in the tapped delay line. The simulated impulse response may be subtracted from the true impulse path response to substantially cancel the interference signal. The Nyquist samples are fitted by adjusting the I and Q component weights, whether they be from a quadrature component signal or a non-quadrature component signal.

Figure 8:
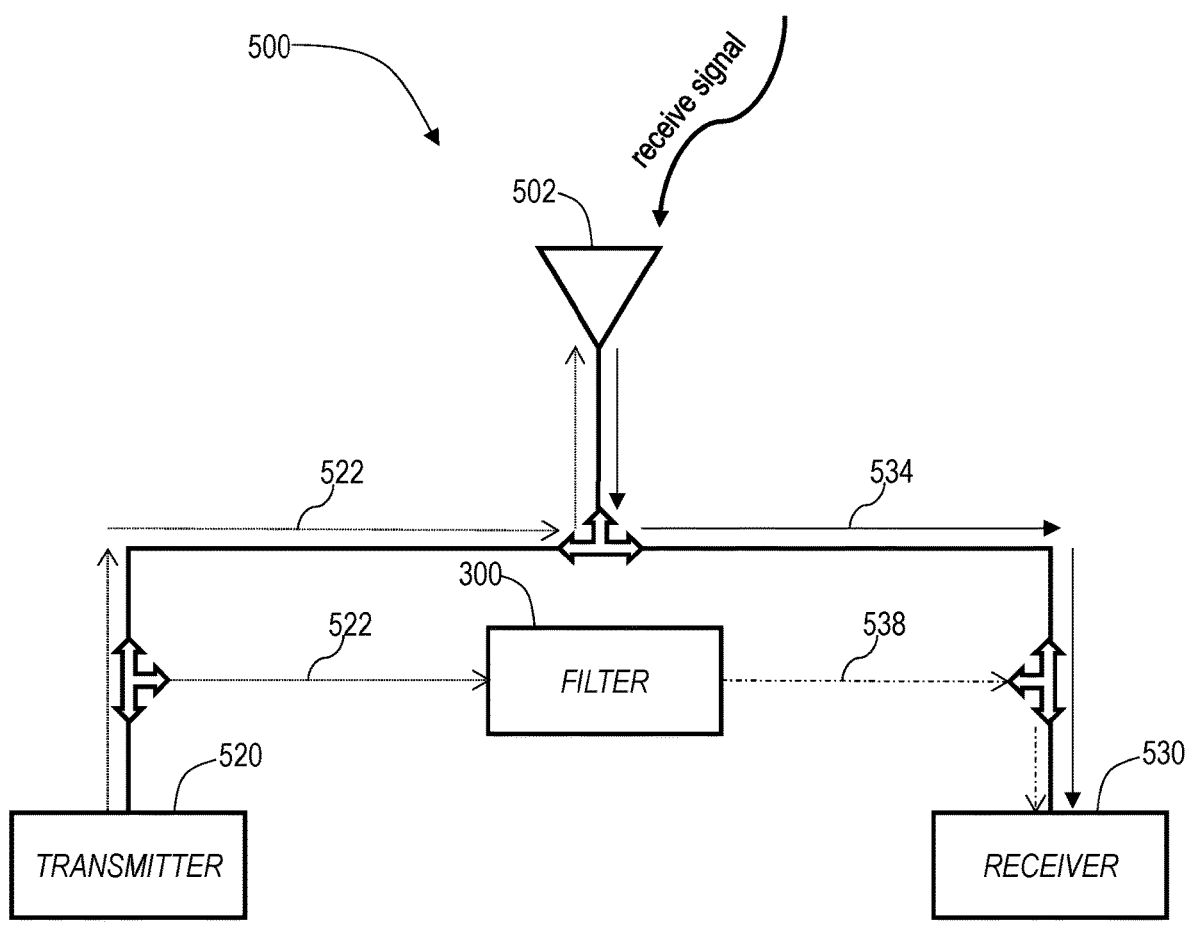
FIG. 8 is a block diagram of a single-antenna transmit and receive system, including the signal filter.

The filter 300 may also be used in conjunction with a single antenna system 500, such as simultaneous transmit and receive ("STAR") antenna as illustrated in FIG. 8. The single antenna system 500 includes a transmit/receive antenna 592 that transmits the transmit signal 422 and also receives the receive signal 434. This results in substantial RF interference between the transmit signal 522 and the receive signal 534.

In such an example, the interference may be cancelled by feeding a portion of the transmit signal 522 to the filter 300 to create a filtered signal 438 as discussed above. The receiver 430 then receives a combination of the receive signal 534 and filtered signal 538.

Figure 9:
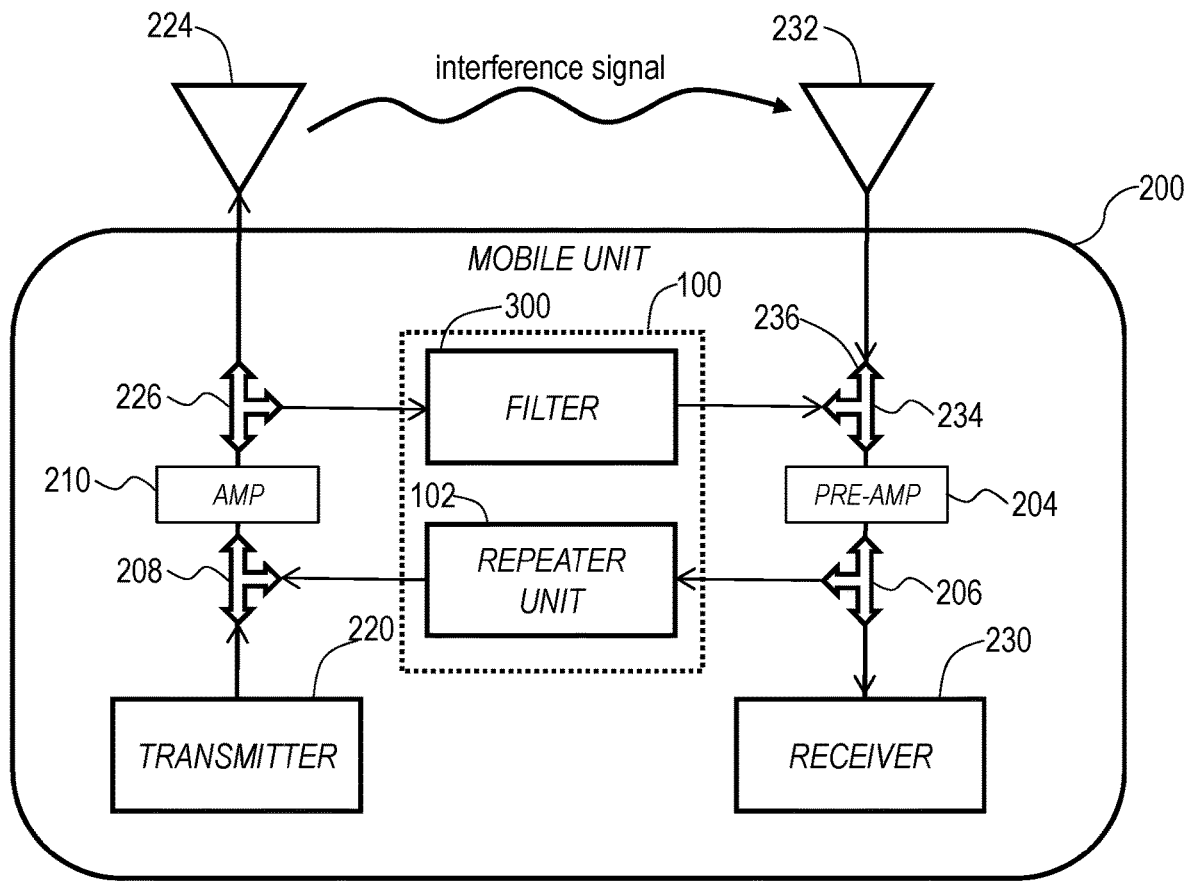
FIG. 9 is a block diagram of a mobile unit including a repeater.

An example of a mobile unit 200 including the repeater 100 is illustrated in FIG. 9. The mobile unit 200 may include the typical hardware and software components one would find in modern mobile communication devices, such as a processor, memory, a keypad, a screen, and I/O ports, among others. The features in FIG. 9 that are in common with FIG. 1 have the same reference numerals.

The repeater 100 includes the signal filter 300 and a repeater unit 102. The repeater unit 102 may include a high gain repeater and a bandpass filter. The repeater unit 102 is coupled to the receiver side so as to receive a portion of the receive signal downstream a pre-amplifier 204. A directional coupler 206 feeds the portion of the receive signal to the repeater unit 102. The output of the repeater unit 102 feeds into a directional coupler 208, which feeds the repeat signal through an amplifier 210 upstream from the transmitter 220.

A combination of the repeat signal and transmitter signal is then fed through another directional coupler 226, which sends a portion of the combination signal through the filter 300 for cancelling the interference signal between the transmit antenna 224 and receive antenna 232 as described previously. The transmitted signal is a combination of the transmit signal and the repeat signal.

In order to provide different mobile units 200 in a network with this repeater function, it may be desirable to program each mobile unit 200 with coordination algorithms through software and/or firmware for each frequency band assignment and for mode control, timing, and other variables.

The example illustrated in FIG. 9 is associated with the two-antenna case. Other examples may be adapted to work in a single-antenna case related to the example of FIG. 8.

By using the signal filter, the mobile unit 200 may function as a same frequency repeater because the signal filter will cancel interference between the transmitted and received signals if the mobile unit only has a single antenna. Likewise other versions of the repeater 100 may include only a single antenna that transmits and receives. In such a case, the signal filter will cancel interference between the transmitted or repeated and received signals.

Using the signal filter 300, the devices and methods described above may be adapted to transmit and receive radio frequency signals at overlapping frequencies simultaneously. Overlapping frequencies occur when the bandwidth of one signal overlaps with the bandwidth of another signal.

EXAMPLE

Interference Signal Cancellation Measurements

This example is provided to show that the filter can be used to cancel an interference signal over a broad operational bandwidth and with a wide instantaneous bandwidth. This example is provided by way of illustration and does not limit the scope of possible embodiments.

FIGS. 10A-F are a series of graphs that illustrate the functionality of the signal filter from 10 MHz to 4700 MHz. The bold line is a combination of the receive signal and interference signal. The narrower line is the received signal with the interference signal cancelled over an instantaneous bandwidth. The quadrature operational frequency of the 90 degree coupler was 1.7-2.7 GHz.

In FIGS. 10A and B, the filter operated in non-quadrature mode because the frequency was below the quadrature operational frequency of the 90 degree coupler. In FIG. 10A, the filter provided about 30 dB cancellation of the interference signal over about 50 MHz. In FIG. 10B, the filter provided about 30 dB cancellation of the interference signal over about 100 MHz.

In FIGS. 10C and D the filter operated in quadrature mode because the frequency was within the quadrature operational frequency of the 90 degree coupler. In FIG. 10C, the filter provided about 30 dB cancellation of the interference signal over about 200 MHz.

In FIG. 10D, the filter provided about 30 dB cancellation of the interference signal over about 200 MHz.

In FIGS. 10E and F, the filter operated in non-quadrature mode. In FIG. 10E, the filter provided about 45 dB cancellation of the interference signal over about 200 MHz. In FIG. 10F, the filter provided about 35 dB cancellation of the interference signal over about 200 MHz.

This example shows that over the range of 10 MHz to 4700 MHz, the filter was able to cancel the interference signal very well, regardless of whether it operates on a quadrature signal or non-quadrature signal.

This disclosure describes certain example embodiments, but not all possible embodiments of the devices and associated methods. Where a particular feature is disclosed in the context of a particular embodiment, that feature can also be used, to the extent possible, in combination with and/or in the context of other embodiments. The devices and associated methods may be embodied in many different forms and should not be construed as limited to only the embodiments described here.

That which is claimed is:

1. A cellular communications method comprising, in a cellular communications network:
(a) receiving by a first mobile unit a wirelessly transmitted signal from a second mobile unit or a base station;
(b) forming a repeat signal by the first mobile unit, the repeat signal being an amplified version of the wirelessly transmitted signal in (a);
(c) transmitting the repeat signal from the first mobile unit; and
(d) cancelling interference caused by transmitting the repeat signal in (c) using a signal filter on the first mobile unit that amplifies quadrature and non-quadrature components of an input signal associated with the repeat signal to produce a filtered repeat signal.

2. The method of claim 1, wherein the wirelessly transmitted signal and signal transmitted in (c) have overlapping frequencies.

3. The method of claim 1, wherein the wirelessly transmitted signal is being received at the same time the signal transmitted in (c) is being transmitted.

4. The method of claim 1, wherein the first mobile unit is a cellular telephone.

5. The method of claim 1, wherein the quadrature components of the input signal are 90 degrees out of phase with each other and the non-quadrature components of the input signal are not 90 degrees out of phase with each other.

6. The method of claim 1, wherein the signal filter includes a signal weight adjuster adapted to impart separate signal weights to the quadrature and non-quadrature components of the input signal.

7. The method of claim 1, wherein the first mobile unit is configured to transmit and receive signals at the same frequency simultaneously.

8. An electronic device comprising:
a mobile unit having an antenna that transmits and receives radio signals within a cellular network, the mobile unit including:
a repeater in communication with a receive signal path and transmit signal path, the repeater being operable to pass a repeated signal associated with the receive signal to the transmit signal path; and
a signal filter communicating with the receive signal path and transmit signal path, the signal filter being operable to amplify quadrature and non-quadrature components of an input signal associated with the repeat signal to produce a filtered repeat signal and to cancel interference caused by the repeated signal in the receive signal path with the filtered repeat signal.

9. The device of claim 8, wherein the mobile unit transmits and receives radio signals at overlapping frequencies.

10. The device of claim 8, wherein the mobile unit transmits and receives radio signals at overlapping frequencies simultaneously.

11. The device of claim 8, wherein the quadrature components of the input signal are 90 degrees out of phase with each other and the non-quadrature components of the input signal are not 90 degrees out of phase with each other.

12. The device of claim 8, wherein the signal filter includes a signal weight adjuster adapted to impart separate signal weights to the quadrature and non-quadrature components of the input signal.

13. The device of claim 8, wherein the mobile unit is a cellular telephone.

14. A radio frequency repeater device comprising:
a receive antenna that receives a receive signal having a first frequency;
a transmit antenna that transmits a repeat signal at the first frequency, the repeat signal being an amplified version of the receive signal;
a signal filter communicating with the receive antenna and transmit antenna, the signal filter being operable to amplify quadrature and non-quadrature components of an input signal associated with the repeat signal to produce a filtered repeat signal; and a coupler that combines the receive signal with the filtered repeat signal in such a way that the filtered repeat signal cancels interference from the transmitted repeat signal in the receive signal.

15. The device of claim 14, wherein the transmit antenna and receive antenna are the same antenna.

16. The device of claim 14, wherein the quadrature components of the input signal are 90 degrees out of phase with each other and the non-quadrature components of the input signal are not 90 degrees out of phase with each other.

17. The device of claim 14, wherein the signal filter includes a signal weight adjuster adapted to impart separate signal weights to the quadrature and non-quadrature components of the input signal.

18. The device of claim 14, wherein the transmit antenna and receive antenna transmit and receive at overlapping frequencies simultaneously.

19. The device of claim 14 on a cellular telephone.

* * * * *